United States Patent
Hong et al.

(10) Patent No.: US 12,018,385 B2
(45) Date of Patent: Jun. 25, 2024

(54) MATERIAL FOR PLASMA SPRAY COMPRISING Y—O—F COMPOUND, METHOD FOR PRODUCING THE SAME, AND SPRAY COATING PREPARED USING THE SAME

(71) Applicant: KoMiCo Ltd., Anseong-si (KR)

(72) Inventors: Ki Won Hong, Anseong-si (KR); Dong Hun Jeong, Anseong-si (KR); Seong Sik Bang, Anseong-si (KR)

(73) Assignee: KOMICO LTD., Anseong-si (KR)

( * ) Notice: Subject to any disclaimer, the term of this patent is extended or adjusted under 35 U.S.C. 154(b) by 0 days.

(21) Appl. No.: 18/339,282

(22) Filed: Jun. 22, 2023

(65) Prior Publication Data

US 2023/0416897 A1    Dec. 28, 2023

(30) Foreign Application Priority Data

Jun. 24, 2022    (KR) .................... 10-2022-0077391

(51) Int. Cl.
| | |
|---|---|
| *C23C 4/11* | (2016.01) |
| *C01F 17/218* | (2020.01) |
| *C01F 17/259* | (2020.01) |
| *C01F 17/265* | (2020.01) |
| *C04B 35/505* | (2006.01) |
| *C04B 35/515* | (2006.01) |
| *C04B 35/553* | (2006.01) |
| *C23C 4/134* | (2016.01) |

(52) U.S. Cl.
CPC ............ *C23C 4/134* (2016.01); *C01F 17/218* (2020.01); *C01F 17/259* (2020.01); *C01F 17/265* (2020.01); *C04B 35/505* (2013.01); *C04B 35/5156* (2013.01); *C04B 35/553* (2013.01); *C23C 4/11* (2016.01)

(58) Field of Classification Search
CPC ..... C04B 35/50; C04B 35/505; C01F 17/218; C01F 17/265; C23C 4/11; C23C 4/134
See application file for complete search history.

(56) References Cited

U.S. PATENT DOCUMENTS

| | | |
|---|---|---|
| 5,340,023 A | 8/1994 | Itoh et al. |
| 10,227,263 B2 | 3/2019 | Nagayamna et al. |
| 2015/0307715 A1 | 10/2015 | Sato et al. |
| 2017/0107604 A1 | 4/2017 | Ibe et al. |
| 2017/0370007 A1 | 12/2017 | Iguchi et al. |

(Continued)

FOREIGN PATENT DOCUMENTS

| | | |
|---|---|---|
| JP | 07110986 B2 | 11/1995 |
| JP | 2018076546 A | 5/2018 |

(Continued)

OTHER PUBLICATIONS

Espacenet Translation of KR 20190017333 A (Year: 2023).*
Espacenet Translation of KR 20190082119 A (Year: 2023).*

*Primary Examiner* — Michael M Dollinger
(74) *Attorney, Agent, or Firm* — NKL Law; Byungwoong Park (57) ABSTRACT

Disclosed are a material for spray for plasma spray coating having high plasma resistance and a method for producing the same. The material for plasma spray comprises an yttrium compound, and the numbers of moles of Y (yttrium), O (oxygen), and F (fluorine) in the yttrium compound satisfy $1.5<(O+F)/Y<2.0$.

5 Claims, 8 Drawing Sheets

(56) References Cited

U.S. PATENT DOCUMENTS

| | | | |
|---|---|---|---|
| 2018/0127318 A1* | 5/2018 | Nagayama | C04B 35/62695 |
| 2018/0362359 A1 | 12/2018 | Sato et al. | |
| 2021/0277509 A1* | 9/2021 | Takai | C23C 4/11 |
| 2024/0026515 A1 | 1/2024 | Iwasaki et al. | |

FOREIGN PATENT DOCUMENTS

| | | | | |
|---|---|---|---|---|
| JP | 2018184657 A | * | 11/2018 | C01F 17/218 |
| JP | 2018184657 A | | 11/2018 | |
| JP | 6918996 B2 | | 8/2021 | |
| JP | 7035293 B2 | | 3/2022 | |
| KR | 101721232 B1 | | 3/2017 | |
| KR | 1020170046076 A | | 4/2017 | |
| KR | 1020190017333 A | | 2/2019 | |
| KR | 1020190082119 A | | 7/2019 | |
| KR | 1020220015004 A | | 2/2022 | |
| KR | 1020220020204 A | | 2/2022 | |
| WO | 2015019673 A1 | | 2/2015 | |
| WO | 2021124996 A1 | | 6/2021 | |

\* cited by examiner

MATERIAL FOR PLASMA SPRAY COMPRISING Y—O—F COMPOUND, METHOD FOR PRODUCING THE SAME, AND SPRAY COATING PREPARED USING THE SAME

CROSS-REFERENCE TO RELATED APPLICATION(S)

This application is based on and claims priority under 35 U.S.C. 119 to Korean Patent Application No. 10-2022-0077391, filed on Jun. 24, 2022, in the Korean Intellectual Property Office, the disclosure of which is herein incorporated by reference in its entirety.

BACKGROUND OF THE INVENTION

1. Field of the Invention

The presently disclosed exemplary embodiments relate to a material for plasma spray containing a Y—O—F (yttrium oxyfluoride) compound and a method for producing the same and, more specifically, to a material for spray for plasma spray coating having high plasma resistance and a method for producing the same.

2. Description of the Prior Art

In recent years, high-integration and ultra-fine line width technologies in semiconductor processes require plasma etching under super-extreme environments, such as high-density plasma, high cleanliness, and excessive electric shocks. In particular, a plasma etching process using reactant gases containing a halogen element, such as F (fluorine), Cl (chlorine), or Br (bromine), with strong chemical reactivity involves etching of various deposition materials on the wafer surface and causing damage to the surface of parts and generation of non-volatile contaminants through chemical and physical reactions with metal or ceramic parts inside a chamber.

Recently, an interest in the coating of ceramic materials showing excellent plasma resistance on the surface of metal or ceramic parts is greatly increasing, and as a representative example, an yttrium oxide ($Y_2O_3$) coating is widely applied.

Yttrium oxide ($Y_2O_3$) shows a high melting point (2,450° C.), chemical stability, and crystallographic stability at up to 2,300° C., and particularly, $Y_2O_3$ shows excellent chemical stability against F radicals, high ion bombardment resistance according to the high atomic mass of yttrium, and excellent plasma resistance resulting from excellent mechanical properties of $YF_3$, a reaction product.

However, when the upper surface of the $Y_2O_3$ coating layer reacts with a plasma gas, such as $SF_6$, $CF_4$, $CHF_3$, or HF, at the beginning of an etching process, the concentration of fluorine-based gas is changed in the chamber, resulting in an increase in the seasoning time of the etching process, and the surface of $Y_2O_3$ reacts with the plasma gas to form contaminant particles containing fluorine, and when this $Y_2O_3$ undergoes a thermal cycle, a difference in thermal expansion coefficient between the contaminant particles and $Y_2O_3$ causes stress, which causes the contaminant particles to be detached.

To solve this problem, $YF_3$ with excellent corrosion resistance was introduced. However, $YF_3$ is melted by ultra-high-temperature plasma during atmospheric plasma spraying (APS), and a fluoride may be partially oxidized to prepare a coating layer in which the fluoride and an oxide are partially mixed, and the coating layer, when compared with a $Y_2O_3$ spray coating layer, may cause problems, such as cracks in the coating layer and many particles in the etching chamber.

To solve the problems of $Y_2O_3$ and $YF_3$, a Y—O—F coating layer having intermediate properties between $Y_2O_3$ and $YF_3$ was introduced.

As an example, Korean Patent Publication No. 10-2019-0017333 (publication date: 2 Feb. 2019) discloses a method for producing a YOF-based powder that causes fewer contaminant particles and is applicable to semiconductor device coating due to excellent plasma resistance by mixing an yttrium oxide ($Y_2O_3$) powder and a $YF_3$ powder at a weight ratio of 1:2 to 2:1 and then thermally heating the mixture.

As another example, Korean patent Publication No. 10-2019-0082119 (Publication date: 9 Jul. 2019) discloses that a mixture powder containing Y, O, and F is used to prepare a YOF coating on a substrate while the components of Y:O:F by XPS (X-ray photoelectron spectroscopy) is 1:1:1, thereby providing a coating having a porosity reduced to 0.01 to 1.0% and a hardness improved to 6 to 12 GPa, leading to high etching resistance against corrosive gases and high-speed bombardment ion particles and excellent plasma resistance.

PATENT DOCUMENTS (Patent Document 1) KR 2019-0017333A
(Patent Document 2) KR 2019-0082119A
(Patent Document 3) JP 6918996B
(Patent Document 4) JP 7035293B

SUMMARY OF THE INVENTION

The above-described plasma spray coating layer of Y—O—F according to the conventional art has the following problems. First, the plasma spray coating layer of Y—O—F according to the conventional art has a significantly higher porosity than other plasma spray coating layers of ceramic materials. While YAG (yttrium aluminum garnet), $Y_2O_3$, and $YF_3$ coating layers show a favorable porosity of less than 3%, the Y—O—F coating layer shows a high porosity of 7% or higher. The size of particles is one of the factors that affect the porosity, and the smaller the size of particles, the lower the porosity and the lower the surface roughness of a coating layer. However, particles with a predetermined size or smaller have a technical problem in that the cohesive force thereof increases due to a closer distance between particles caused by a decreased size, and the powder transfer per se to the center of the plasma is impossible due to frictional static electricity generated during powder transfer. Hence, there is a limit to lowering the porosity through the reduction in the size of the particles.

Next, the plasma spray coating layer of Y—O—F has lower hardness than other plasma spray coating layers of ceramic materials. A YAG coating layer shows a hardness of 600-700 Hv and a $Y_2O_3$ coating layer shows a hardness of 450-550 Hv, but a Y—O—F coating layer shows a hardness of 300-400 Hv. The Y—O—F coating layer, even though chemically stable, is easily etched by physical ion bombardment occurring during dry etching due to low physical properties thereof, resulting in the generation of particles, which may be a fatal disadvantage in the coating layer, and weak mechanical properties in the preparation process of a spray coating layer may be also a problem.

Last, the plasma spray coating layer of Y—O—F is known to be strong in a process of using both oxygen radicals and fluorine-based plasma gas, but in some processes, an F− ion gas is incorporated during a semiconductor process due to a high content of fluorine, resulting in an increase in the etch rate.

Accordingly, an aspect of the presently disclosed exemplary embodiments is to provide a Y—O—F spray coating layer, which contains a ternary compound as a main component, has lower porosity and higher hardness compared with a conventional plasma spray coating layer of Y—O—F, and has physical stability and chemical stability against plasma gas generated during etching.

Another aspect of exemplary embodiments is to provide a material for spray suitable for the preparation of a plasma spray coating layer of Y—O—F having improved characteristics.

Still another aspect of exemplary embodiments is to provide a method for producing the above-described material for spray.

In accordance with an aspect of exemplary embodiments, there is provided a material for plasma spray containing an yttrium compound, wherein the numbers of moles of Y, O, and F in the yttrium compound satisfy $1.5<(O+F)/Y<2.0$.

In exemplary embodiments, the yttrium compound may contain a Y—O—F compound and $Y_2O_3$. Particularly, the Y—O—F compound may contain a first Y—O—F compound with O/F=1 and a second Y—O—F compound with O/F<1. Furthermore, the second Y—O—F compound may include at least one compound selected from the group consisting of $Y_4O_3F_6$, $Y_5O_4F_7$, $Y_6O_5F_8$, and $Y_7O_6O_9$. For example, the second Y—O—F compound may include $Y_5O_4F_7$.

In exemplary embodiments, the content (% by weight) of the second Y—O—F compound is preferably lower than the content (% by weight) of the first Y—O—F compound.

In exemplary embodiments, the content (% by weight) of $Y_2O_3$ is preferably 10-30%, and more preferably 15-25%.

In accordance with another aspect of exemplary embodiments, there is provided a method for producing a material for plasma spray, the method including: feeding an yttrium compound into an air plasma jet; melting the yttrium compound; and cooling droplets of the molten yttrium compound.

In exemplary embodiments, the cooling of the droplets of the molten yttrium compound further includes: spraying the droplets of the molten yttrium compound onto a coolant; removing the coolant from the sprayed yttrium compound; and drying the sprayed yttrium compound.

When the droplets of the molten yttrium compound are sprayed, a separation distance from a spray outlet to a surface of the coolant is 400 to 600 mm.

In exemplary embodiments, the material produced during the above method is a yttrium compound powder, and in the yttrium compound powder, the numbers of moles of Y (yttrium), O (oxygen), and F (fluorine) satisfy $1.5<(O+F)/Y<2.0$.

In accordance with still another aspect of exemplary embodiments, there is provided a plasma spray coating containing an yttrium compound, wherein the numbers of moles of Y, O, and F in the yttrium compound satisfy $1.5<(O+F)/Y<2.0$ and the plasma spray coating has a porosity of less than 3%.

According to exemplary embodiments, a spray coating layer of Y—O—F can be provided that has low porosity and high hardness and exhibits physical stability and chemical stability against plasma gases generated during etching.

Furthermore, according to exemplary embodiments, a Y—O—F material for spray can be provided, that has a densified structure and high density through a simple method and has a high O/F ratio, by spheroidizing a Y—O—F-based powder through atmospheric melting.

DETAILED DESCRIPTION OF THE EXEMPLARY EMBODIMENTS

Unless defined otherwise, all the technical and scientific terms used herein have the same meaning as commonly understood by one having ordinary skill in the art to which exemplary embodiments belong. In general, the nomenclature used herein are well known and commonly employed in the art.

As used herein, when a certain component "includes" or "comprises" an element, unless there is a description contrary thereto, the component can further include other elements, not excluding the other elements.

As used herein, the term "non-spheroidization" refers to a state that has not been subjected to spheroidization described herein.

Herein, a Y—O—F compound means a ternary compound of Y (yttrium), O (oxygen), and F (fluorine), represented by the chemical formula $Y_xO_yF_z$, but is not necessarily limited thereto, and the compound may contain trace amounts of additional elements that can be dissolved while maintaining its crystal structure.

For example, the Y—O—F compound of exemplary embodiments may include at least one compound selected from the group consisting of YOF, $Y_7O_6F_9$, $Y_6O_5F_8$, $Y_5O_4F_7$, and $Y_4O_3F_6$. A Y—O—F compound in which the molar ratio of O/F is 1 is known to be YOF, and the other compounds have an O/F molar ratio of less than 1. In the Y—O—F compound represented by the chemical formula $Y_xO_yF_z$, as x decreases, the molar ratio of O/F decreases and F becomes abundant.

The material for plasma spray of exemplary embodiments contains at least two different species of Y—O—F compounds. In exemplary embodiments, a first Y—O—F compound may be YOF and a second Y—O—F compound may be at least one compound selected from the group consisting of $Y_7O_6F_9$, $Y_6O_5F_8$, $Y_5O_4F_7$, and $Y_4O_3F_6$.

Table 1 below compares the molar ratio of O/F and the molar ratio of (O+F)/Y in each of the Y—O—F compound mentioned herein with those in $Y_2O_3$ and $YF_3$.

TABLE 1

| Classification | O/F | (O + F)/Y |
|---|---|---|
| $Y_2O_3$ | — | 1.5 |
| YOF | 1 | 2 |
| $Y_7O_6F_9$ | 0.667 | 2.14 |
| $Y_6O_5F_8$ | 0.625 | 2.17 |
| $Y_5O_4F_7$ | 0.57 | 2.2 |
| $Y_4O_3F_6$ | 0.5 | 2.25 |
| $YF_3$ | 0 | 3 |

As described above, the material for plasma spray of exemplary embodiments contains YOF in which (O+F)/Y is 2 and a Y—O—F compound in which (O+F)/Y is more than 2, for example, at least one compound selected from the group consisting of $Y_7O_6F_9$, $Y_6O_5F_8$, $Y_5O_4F_7$, and $Y_4O_3F_6$. Nevertheless, the material for plasma spray of exemplary embodiments has an (O+F)/Y value of less than 2.0 in the entire composition thereof.

Preferably, (O+F)/Y in the entire composition may be not more than 1.99, 1.98, 1.97, 1.96, or 1.95. In addition, (O+F)/Y in the entire composition of the material for plasma spray of exemplary embodiments may be 1.8 or more, 1.85 or more, or 1.9 or more.

The content (% by weight) of $Y_2O_3$ in the composition of the material for plasma spray of exemplary embodiments may be 10 wt % or more or 15 wt % or more. In addition, the content of $Y_2O_3$ in the composition may be 30 wt % or less or 25 wt % or less.

As described above, the material for plasma spray may contain a first Y—O—F compound composed of YOF and a second Y—O—F compound composed of at least one compound selected from the group consisting of $Y_7O_6F_9$, $Y_5O_4F_7$, and $Y_4O_3F_6$. Particularly, the content (wt %) of the first Y—O—F compound is preferably more than the content of the second Y—O—F compound.

According to another aspect of exemplary embodiments, the above-described material for plasma spray of exemplary embodiments may be produced by including the steps of: (a) feeding a powder containing an yttrium compound into a plasma jet, followed by melting; (b) cooling droplets of the molten yttrium compound.

Figure 1:
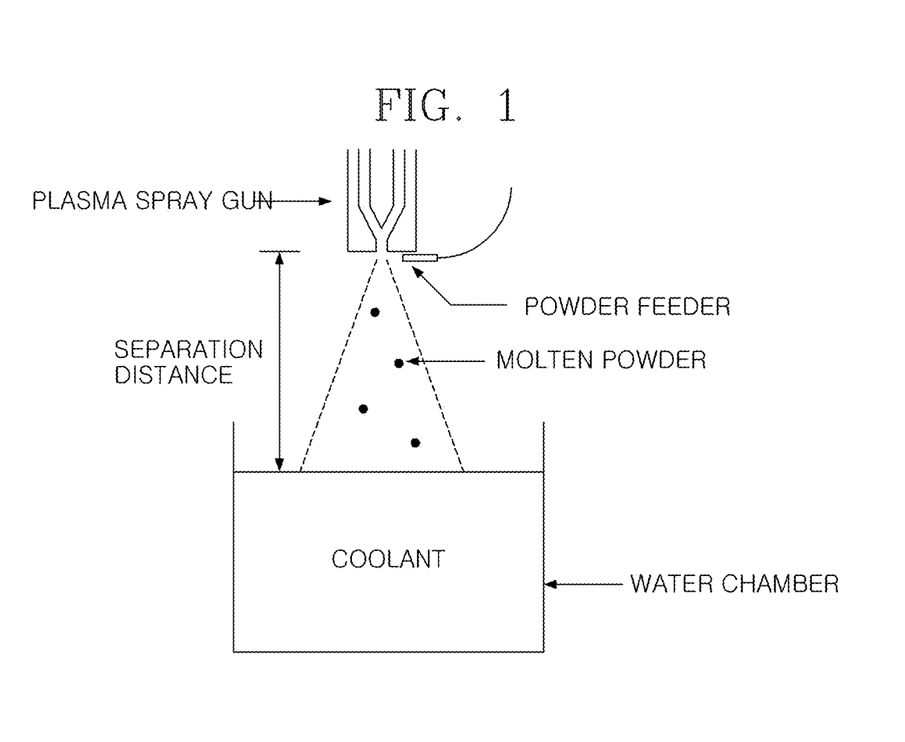
FIG. 1 schematically shows a method and apparatus for producing a material for spray according to an exemplary embodiment.

FIG. 1 schematically shows a method and apparatus for producing a material for spray according to an example of exemplary embodiments. Hereinafter, the producing method of exemplary embodiments will be described with reference to the drawing.

According to exemplary embodiments, in step (a), a powder having a composition of an yttrium compound is fed into an atmospheric plasma jet and melted.

When thermal plasma is generated in a plasma apparatus, an arc discharge is made between a cathode and an anode while a large amount of gas is allowed to flow, so that the plasma is ejected in a jet state. This is called a plasma jet or a plasma torch. In step (a), the powder is fed into the plasma jet so that the powder is melted within a short time. Particularly, when the plasma apparatus generates a plasma jet in an open state to the atmosphere, such a jet is called an atmospheric plasma jet.

In exemplary embodiments, (O+F)/Y in the composition of the powder fed into the plasma jet may be 2.1 or more, 2.2 or more, 2.3 or more, 2.4 or more, or 2.5 or more, and 3.0 or less, 2.9 or less, 2.8 or less, 2.7 or less, or 2.6 or less.

For example, the powder composition may contain a Y—O—F compound, such as at least one compound selected from the group consisting of YOF, $Y_7O_6F_9$, $Y_6O_5F_8$, $Y_5O_4F_7$, and $Y_4O_3F_6$. Also, the powder composition may further contain $YF_3$.

In exemplary embodiments, the plasma apparatus is preferably an atmospheric plasma spraying (APS) apparatus, which has a temperature sufficient to melt a powder.

Next, in step (b), the molten droplets are cooled. This step may be performed by rapidly spraying the molten YOF-based droplets to a coolant using any one selected from water, $N_2$, and Ar, with a predetermined separation distance from a spray outlet through which the molten droplets are sprayed.

According to an exemplary embodiment, the separation distance means a distance from a spray outlet of a plasma spray gun to the surface of a coolant, wherein the separation distance is preferably maintained in the range of 300 to 800 mm so that the molten YOF-based droplets can be sprayed to the coolant without loss to show a rapid cooling effect and an improvement in yield. More preferably, the separation distance is maintained in the range of 400 to 600 mm. A separation distance of less than 400 mm causes significant solvent and powder losses due to the spray pressure, and a separation distance of more than 600 mm causes a decrease in yield and an insufficient cooling effect of the molten powder due to the spray angle.

Meanwhile, the coolant rapidly cools the sprayed molten yttrium compound droplets to allow the droplets to be spherical and highly dense. According to an exemplary embodiment, the molten droplets rapidly sprayed onto the coolant undergo quenching by rapid cooling, and the droplets are spheroidized for minimization of the surface energy while highly densified, leading to an improvement in hardness. Particularly, the coolant may be at least one selected from water, $N_2$, and Ar, and the component ratio of a produced powder can be adjusted according to the type of the coolant.

For example, when the molten droplets are rapidly sprayed onto distilled water ($H_2O$) to be quenched by rapid cooling, the F component of the yttrium compound reacts with hydrogen of the distilled water to form hydrogen fluoride, resulting in a reduction in the F content, but when $N_2$ or Ar is used as a coolant, the droplets are rapidly cooled without reaction of the coolant and the yttrium compound, causing no reduction in the F content. As described above, the composition of a produced powder can be adjusted by varying the coolant.

After the cooling of the droplets, the coolant is removed, and the obtained powder may be appropriately dried. The removal of the coolant and the drying of the powder may be performed by typical methods, which are omitted for the sake of brevity.

The powder produced by the above-described method is a spherical powder having a particle size of 10 to 60 μm. In general, YOF-based particles with a smaller diameter enable the preparation of a densified coating layer, but particles with a diameter of less than 10 μm may generate cohesive force due to rather a closer distance between particles, causing a technical problem in that appropriate feeding is not possible. Therefore, the spherical powder of exemplary embodiments has a particle size of 10 μm or more, thereby enabling densification and causing no agglomeration at the time of coating, leading to a high-density film. The average particle size of the molten powder is preferably 15 to 45 μm.

In exemplary embodiments, the material for spray produced by melting and rapid cooling in the plasma jet has different properties from the raw material fed into the plasma apparatus.

First, the material for spray produced in exemplary embodiments is a spherical powder, which has hollowness inside and a shell with high density outside, and the outer diameter of the powder shows shrinkage due to densification.

Next, the yttrium compound obtained by the producing method of exemplary embodiments has a variation in the negative ion composition from the raw material. For example, according to exemplary embodiments, when the yttrium compound is represented by XY (X is a negative ion, e.g., oxygen and/or fluorine), the molar ratio of the negative ion (X) and the positive ion (Y), that is, X/Y is varied based on the value of 2. For example, the yttrium compound of the raw powder has a X/Y value of at least 2, but the X/Y value of the material for spray treated with an atmospheric plasma jet is shifted to be smaller than 2. It may be because by plasma treatment in an atmospheric pressure atmosphere, air in the atmosphere is incorporated into a plasma jet flame and reacts with the droplets in the plasma jet.

As described above, the material for plasma spray produced by treating the raw powder for a short time in the atmospheric plasma jet may have the following characteristics.

First, the material for plasma spray may be composed of an oxygen-rich yttrium compound, compared with the powder before plasma treatment, due to an increase in oxygen content therein. Next, the material for plasma spray is treated within a short time and thus is present in a mixed state of an yttrium compound with X/Y>2 and an yttrium compound with X/Y<2. In addition, the material for plasma spray of exemplary embodiments may generate a densified spherical powder by melting.

Hereinafter, a method for preparing a spray coating using the above-described material for spraying is described.

In most cases, atmospheric plasma spraying (APS) is a thermal spray technique whereby a powder or a linear material is changed into molten droplets by using a high-temperature thermal source and the droplets are rapidly cooled and coagulated by bombardment to a substrate at a high speed, thereby preparing a lamination coating. According to an exemplary embodiment, APS is a coating preparation technique whereby a gas, such as Ar, He, or $N_2$, is made into plasma by an arc in the atmosphere, and this is ejected from a nozzle while an ultra-high-temperature and high-speed plasma jet is used as a heat source, wherein the material for spray is bombarded to an object to be treated at high speed, and thus a coating with high adhesive strength and high density can be prepared, but the work is performed in an atmospheric pressure atmosphere and thus the surrounding air is incorporated into a plasma jet flame, resulting in a coating which has high porosity and is mixed with an oxygen or impurities depending on the coating material.

The yttrium compound coating layer prepared by coating the material for spray, produced by the above-described method, on a substrate by such an APS method is densified with a porosity of less than 2%, shows a hardness of 550 Hv or more, indicating high hardness, and has significantly improved mechanical properties, and thus can have an increase in resistance to physical ion bombardment occurring during dry etching.

The increase in resistance to ion bombardment is due to a change in the molar ratio of (O+F)/Y in the yttrium compound, which constitutes the coating layer. The reason is that the oxygen content in the yttrium compound increases due to the oxidation occurring during spheroidization of the material for spray and the additional oxidation occurring during coating by the APS, thereby suppressing the generation of an yttrium compound with an O/F of less than 1, such as $Y_7O_6F_9$, $Y_6O_5F_8$, $Y_5O_4F_7$, or $Y_4O_3F_6$ in the spray coating. Preferably, the Y—O—F compound present in the spray coating of exemplary embodiments is YOF in which O/F is 1.

In the yttrium compound coating prepared by the above-described atmospheric plasma spraying, (O+F)/Y may have a value of less than 1.9, less than 1.85, less than 1.8, or less than 1.75, or may have a value of greater than 1.6, greater than 1.65, or greater than 1.7. Preferably, the spray coating of exemplary embodiments contains YOF and $Y_2O_3$ as yttrium compounds, and the content (wt %) of $Y_2O_3$ is more than the content of YOF. For example, the content (wt %) of $Y_2O_3$ in the coating is preferably two times or more than the content of YOF.

In addition, the yttrium compound coating prepared according to exemplary embodiments is a densified spray coating having a porosity of 3% or less, and more preferably 2% or less.

Hereinafter, exemplary embodiments will be described in more detail with examples, but exemplary embodiments is not limited by the examples.

A. Production of yttrium Compound Material for Spray

A granular powder of an yttrium compound having the composition shown in Table 2 below was subjected to atmospheric plasma spraying treatment by the plasma spraying apparatus of FIG. 1.

TABLE 2

| Composition | Content |
| --- | --- |
| $Y_5O_4F_7$ | 86 wt % |
| $YF_3$ | 14 wt % |

The plasma was formed in the apparatus of FIG. 1, and then the yttrium compound powder having the composition of Table 2 was injected into the plasma flow and heated. Particularly, conditions, such as plasma formation conditions and a powder injection angle, were established according to Table 3 below. The separation distance between a nozzle of a plasma gun and the surface of a cooling medium was maintained at 300 to 800 mm. The discharged droplets were quenched by contact with water, and then a spherical powder was separated from water and then dried. The powder injection may be performed in a single feeder or double feeder manner. In the case of a single feeder, the powder injection angle was set at 90 degrees, and in the case of a double feeder, one was maintained at 90 degrees and the other at 105 degrees.

TABLE 3

| Voltage (V) | Current (A) | Power (kW) | Gas 1 | Injection flow rate (NLPM) | Gas 2 | Injection flow rate (NLPM) |
| --- | --- | --- | --- | --- | --- | --- |
| 60-80 | 400-700 | 30-50 | Ar | 35-50 | $H_2$ or He | 6-19 |

The yield of a spray coating depending on the separation distance was calculated according to the following formula.

Yield (%)=(total amount of powder obtained after drying/total amount of powder fed)*100

Table 4 shows the yield depending on the separation distance.

TABLE 4

| Separation distance (mm) | Yield (%) |
| --- | --- |
| 300 | 70 |
| 400 | 84 |
| 500 | 90 |
| 600 | 87 |
| 700 | 80 |
| 800 | 75 |

It can be seen from Table 4 that the highest yield is obtained at 400 to 600 mm.

Figure 2A:
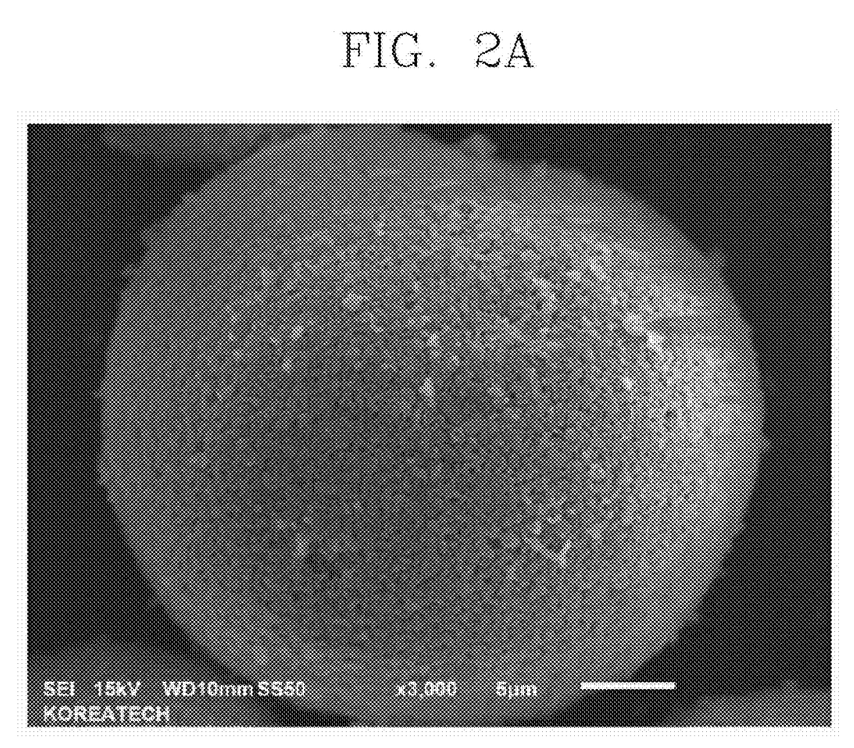
FIGS. 2A and 2B show images of appearances of a powder before and after plasma treatment in an exemplary embodiment.
Figure 2B:
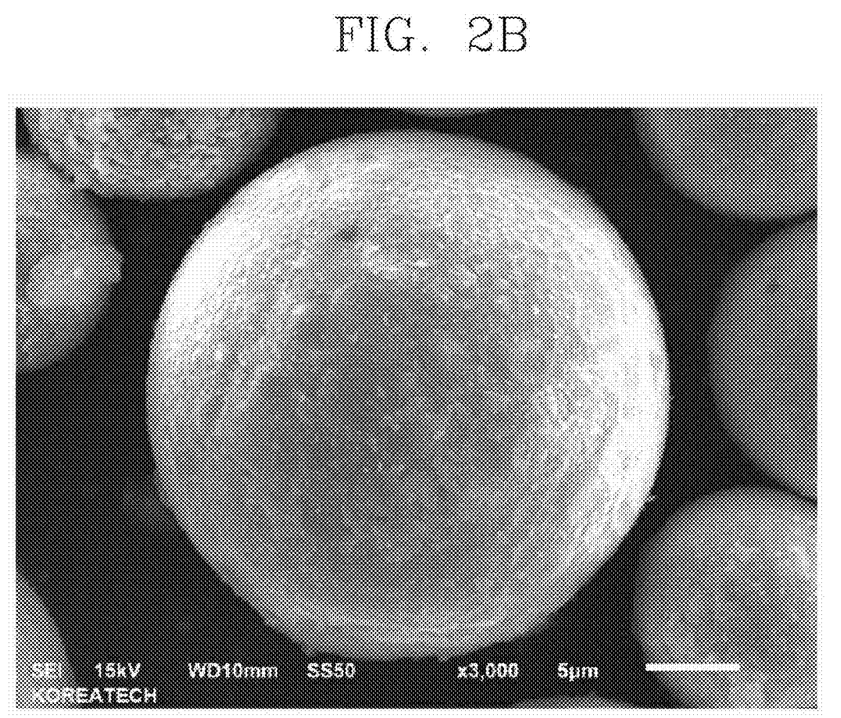

FIGS. 2A and 2B show images of appearances of a granular raw powder used in the present experiment and a material for spray obtained after plasma treatment of the granular raw powder, respectively.

Figure 4:
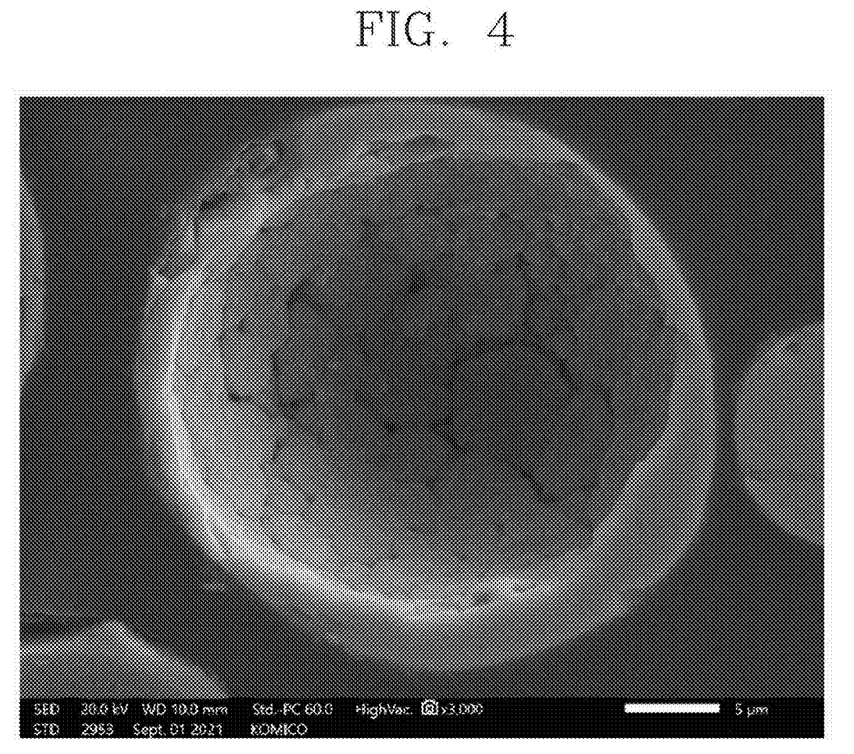
FIG. 4 is an electron microscopic image of a cross-section of a spray powder produced according to an exemplary embodiment.

FIG. 2B confirmed an appearance of a spherical powder, which was densified by melting after plasma treatment. FIG. 4 shows a cross-section of the spraying powder produced in exemplary embodiments, wherein the spraying powder particles have a structure with hollowness inside and a densified shell outside.

The raw powder particle on the left had a size of approximately 30 μm, but the molten particle on the right had a size of 20 μm or less, indicating a significantly decreased particle size.

Figure 3:
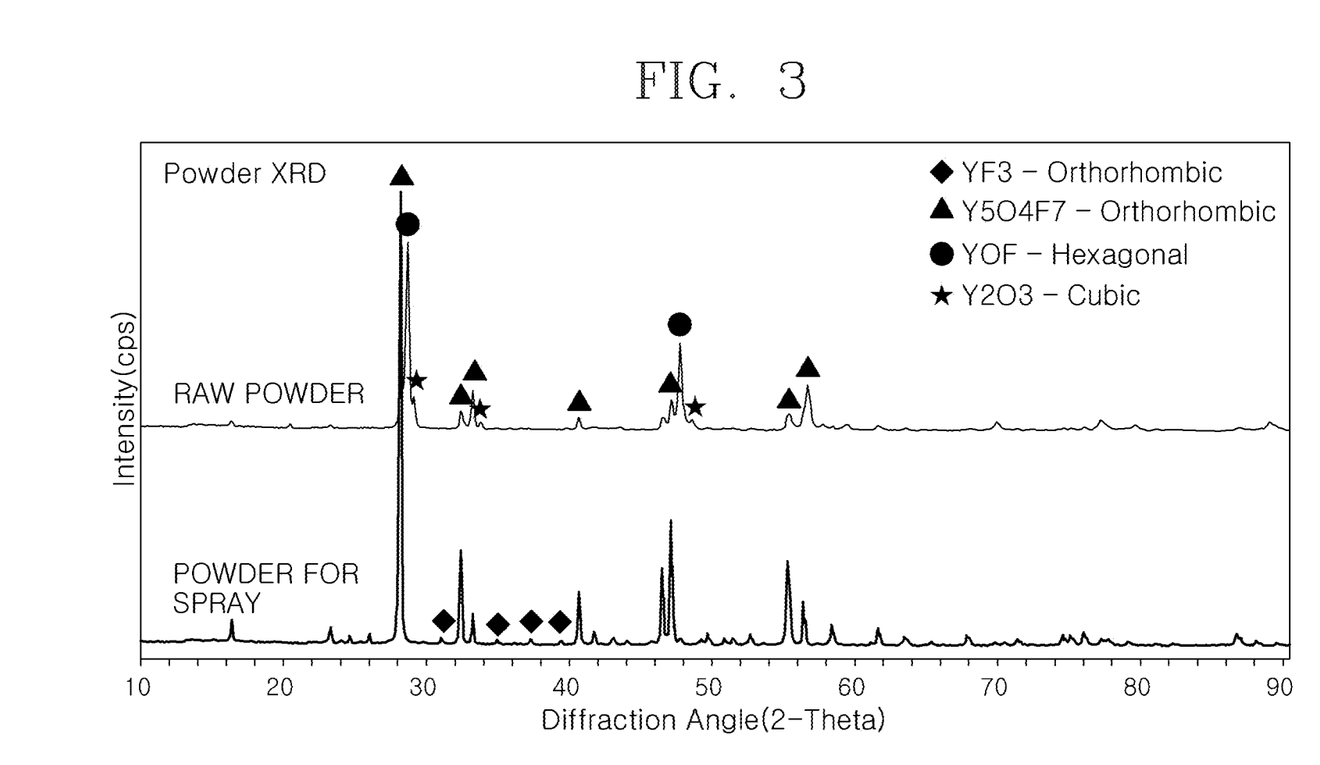
FIG. 3 shows XRD (X-ray diffraction) analysis results of a powder before and after plasma treatment in an exemplary embodiment.

FIG. 3 is a graph showing X-ray diffraction analysis results of a granular raw powder used in the present experiment and a material powder for spray obtained after plasma treatment, respectively.

As shown, the granular raw powder is composed of $Y_5O_4F_7$ and $YF_3$, but in the spraying powder subjected plasma treatment, remarkable YOF and $Y_2O_3$ peaks were observed with a reduced $Y_5O_4F_7$ peak, and the $YF_3$ peak was not substantially detected.

Table 5 below shows XRD (X-ray diffraction) quantitative analysis results of the granular raw powder and the spraying powder. Table 5 shows the (O+F)/Y molar ratio calculated from the quantitative analysis results.

TABLE 5

| Composition | Raw powder | Spray powder |
| --- | --- | --- |
| $Y_5O_4F_7$ | 86 wt % | 33 wt % |
| $YF_3$ | 14 wt % | — |
| YOF | — | 47 wt % |
| $Y_2O_3$ | — | 20 wt % |
| Molar ratio of (O + F)/Y | 2.54 | 1.93 |

B. Preparation of Plasma Spray Coating

A spray coating was prepared by atmospheric plasma spraying (APS) using the spraying powder produced in the present experiment (example). Particularly, Al 6061 (50 mm*50 mm*5T) was used as a substrate. For comparison, a spray coating is prepared by APS using the granular raw powder used in the present experiment (comparative example).

Plasma spraying conditions for preparing the spray coatings of the example and comparative example are shown in Table 6.

TABLE 6

| Voltage (V) | Current (A) | Power (kW) | Gas 1 | Injection flow rate (NLPM) | Gas 2 | Injection flow rate (NLPM) | Transfer pressure (NLPM) | Separation distance (mm) |
| --- | --- | --- | --- | --- | --- | --- | --- | --- |
| 60-80 | 400-700 | 30-50 | Ar | 35-50 | $H_2$ or He | 6-19 | 2.0-7.0 | 100-200 |

The hardness, porosity, and surface roughness of the prepared spray coatings were measured. The porosity was calculated as the ratio of the area occupied by pores on the cross-sectional image by using Image pro, an image analysis software, after cross sections of the spray coatings were photographed by scanning electron microscope (SEM).

Additionally, the etch rate of the prepared spray coatings was measured. The prepared spray coatings were etched according to the etching conditions shown in Table 7 below by Lam Kiyo 45™, wherein the etch rate was calculated by measuring the step difference of the boundary between etched area/non-etched area using AFM.

TABLE 7

| Equipment | Pressure (mTorr) | RF Power (Source, W) | RF Power (Bias, W) | CF4:O2:Ar (sccm) | Etch time (hr) |
|---|---|---|---|---|---|
| Lam Kiyo 45 ™ | 10 mTorr | 1000 | 300 | 200:20:20 | 10 |

Figure 5A:
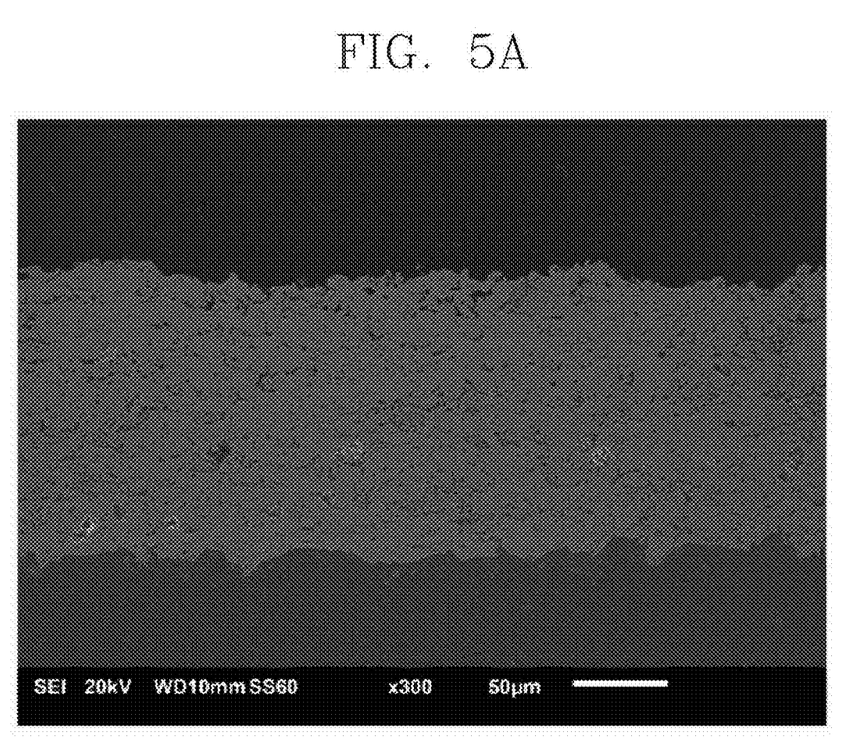
FIGS. 5A and 5B show an electron microscopic image of a cross-section of a spray coating prepared according to an exemplary embodiment.
Figure 5B:
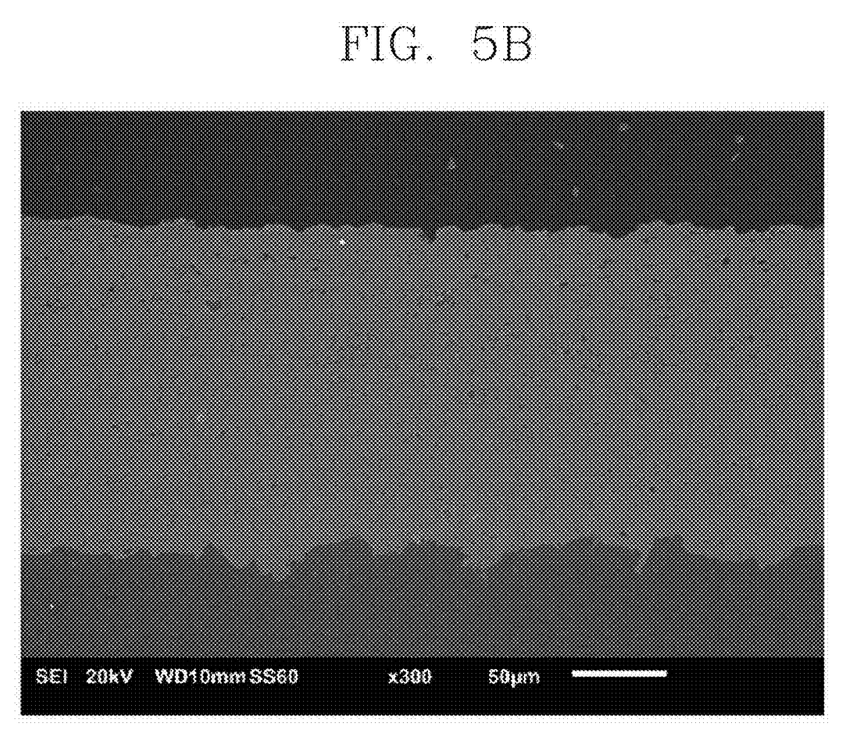

FIGS. 5A and 5B are electron microscopic images of cross sections of the spray coatings prepared according to the comparative example and the example, respectively.

Referring to FIG. 5, the spray coating of the example was very densified compared with the spray coating of the comparative example.

Figure 6:
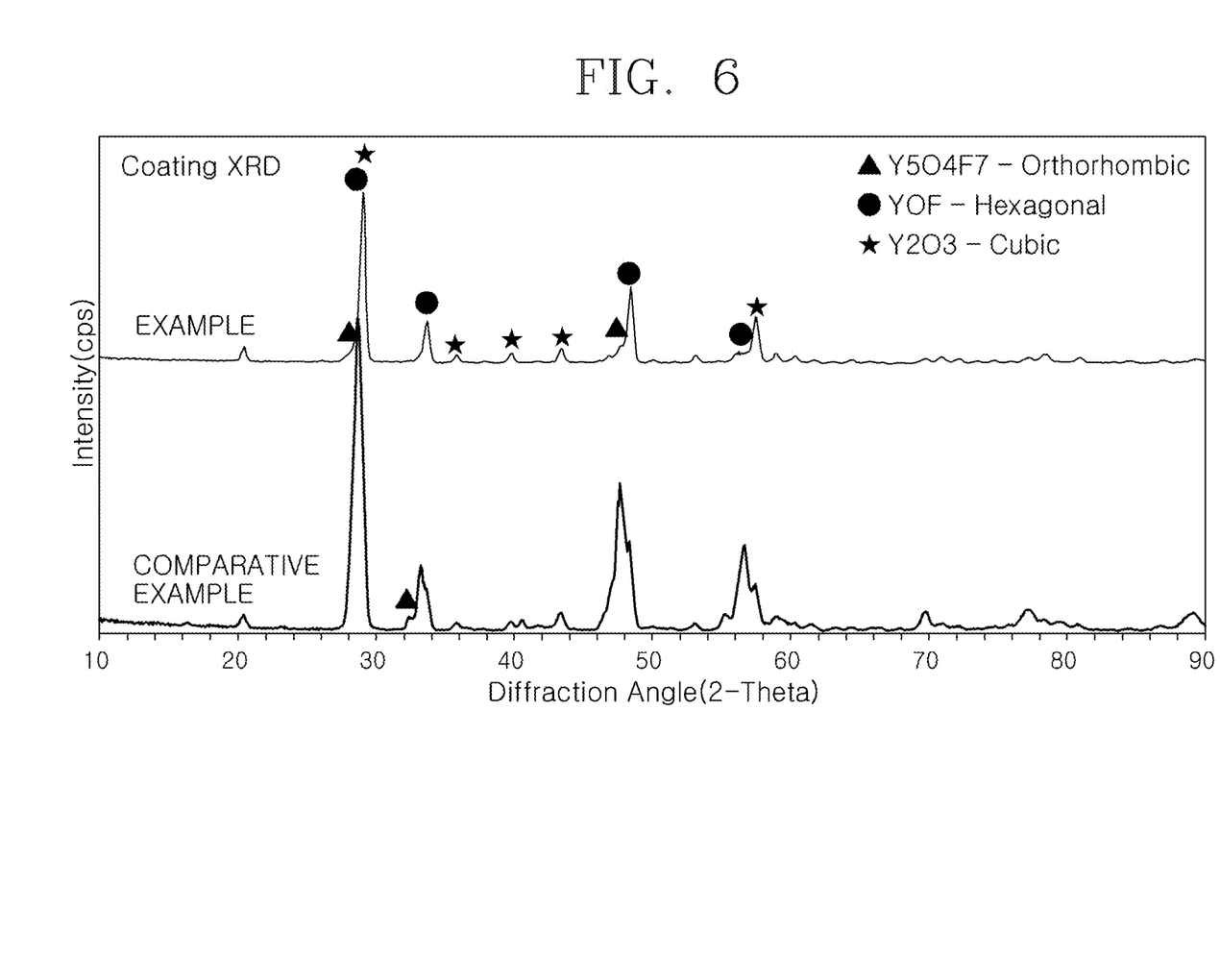
FIG. 6 shows X-ray diffraction analysis results of a spray coating prepared according to an exemplary embodiment.

FIG. 6 is a graph showing X-ray diffraction analysis results of the spray coatings prepared according to the comparative example and the example, respectively.

Referring to FIG. 6, the spray coating of the example showed a high content of $Y_2O_3$, wherein the Y—O—F compounds present in the material for spray were no longer present. This indicates a reduction in the F content and an increase in the oxygen content in the composition of the spray coating.

Table 8 below shows the XRD quantitative analysis results of the spray coatings of the comparative example and the example. Table 8 shows the molar ratio of (O+F)/Y calculated from the quantitative analysis results.

TABLE 8

| Composition | Comparative Example | Example |
|---|---|---|
| $Y_5O_4F_7$ | 19 wt % | — |
| YOF | 54 wt % | 29 wt % |
| $Y_2O_3$ | 27 wt % | 71 wt % |
| Molar ratio of (O + F)/Y | 1.91 | 1.71 |

Table 9 below shows the summary of measurement results of hardness, porosity, surface roughness, and etch rate of the spray coatings.

TABLE 9

| Classification | Example | Comparative Example |
|---|---|---|
| Hardness (Hv) | >600 | <400 |
| Porosity (%) | <2% | >7% |
| Roughness (μm) | 2.5~3.0 | 4.0~5.0 |
| Etch rate (μm/hr) | 1.32 | 1.64 |

It can be seen from Table 9 that the spray coating of the example had high hardness and high resistance to etching through a densified organization structure.

The present disclosure has been described above with exemplary embodiments and drawings, but these are only provided to help a more general understanding of the present disclosure, and the present disclosure is not limited to the exemplary embodiments. A person skilled in the art to which the present disclosure pertains will recognize that various modifications and variations can be made without departing from the essential characteristics of the present disclosure. Therefore, the spirit of the present disclosure is defined by the appended claims rather than by the description preceding them, and all changes and modifications that fall within metes and bounds of the claims, or equivalents of such metes and bounds are therefore intended to be embraced by the range of the spirit of the present disclosure.

What is claimed is:

1. A material for plasma spray comprising an yttrium compound, wherein the numbers of moles of Y (yttrium), O (oxygen), and F (fluorine) in the yttrium compound satisfy 1.5<(O+F)/Y<2.0,
    wherein the yttrium compound comprises a Y—O—F compound and $Y_2O_3$, and
    wherein the Y—O—F compound comprises a first Y—O—F compound with O/F=1 and a second Y—O—F compound with O/F<1, wherein the content of $Y_2O_3$ is 15-25 wt %.

2. The material for plasma spray of claim 1, wherein the second Y—O—F compound includes at least one compound selected from the group consisting of $Y_4O_3F_6$, $Y_5O_4F_7$, $Y_6O_5F_8$, and $Y_7O_6O_9$.

3. The material for plasma spray of claim 1, wherein the second Y—O—F compound includes $Y_5O_4F_7$.

4. The material for plasma spray of claim 1, wherein a content % by weight of the second Y—O—F compound is lower than a content % by weight of the first Y—O—F compound.

5. A plasma spray coating comprising an yttrium compound, wherein the numbers of moles of Y, O, and F in the yttrium compound satisfy 1.6<(O+F)/Y<1.9 and the porosity of the plasma spray coating is 3% or less,
    wherein the yttrium compound comprises YOF and $Y_2O_3$, and
    wherein a content % by weight of $Y_2O_3$ is more than a content % by weight of YOF.

* * * * *